US008848509B2

(12) United States Patent
Allan

(10) Patent No.: US 8,848,509 B2
(45) Date of Patent: Sep. 30, 2014

(54) THREE STAGE FOLDED CLOS OPTIMIZATION FOR 802.1AQ

(75) Inventor: David Ian Allan, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 140 days.

(21) Appl. No.: 13/458,675

(22) Filed: Apr. 27, 2012

(65) Prior Publication Data

US 2013/0286817 A1    Oct. 31, 2013

(51) Int. Cl.
    *H04L 12/16*    (2006.01)
(52) U.S. Cl.
    USPC ............................................. 370/216; 370/401
(58) Field of Classification Search
    None
    See application file for complete search history.

(56) References Cited

U.S. PATENT DOCUMENTS

| 6,084,858 | A | 7/2000 | Matthews et al. |
|---|---|---|---|
| 7,911,944 | B2 | 3/2011 | Chiabaut et al. |
| 8,248,925 | B2 | 8/2012 | Allan et al. |
| 8,509,618 | B2 * | 8/2013 | Boertjes et al. ............... 398/49 |
| 2007/0002770 | A1 | 1/2007 | Haalen et al. |
| 2007/0177527 | A1 | 8/2007 | Bragg et al. |
| 2010/0182934 | A1 | 7/2010 | Dobbins et al. |
| 2011/0026438 | A1 | 2/2011 | Farkas et al. |
| 2011/0060844 | A1 | 3/2011 | Allan et al. |
| 2011/0128857 | A1 | 6/2011 | Chiabaut et al. |
| 2011/0273980 | A1 | 11/2011 | Ashwood Smith |
| 2012/0039161 | A1 | 2/2012 | Allan et al. |
| 2012/0057603 | A1 | 3/2012 | Allan et al. |
| 2012/0063465 | A1 * | 3/2012 | Keesara et al. ............... 370/401 |
| 2012/0281524 | A1 * | 11/2012 | Farkas ............... 370/221 |
| 2012/0307832 | A1 | 12/2012 | Allan et al. |
| 2013/0080602 | A1 * | 3/2013 | Keesara et al. ............... 709/220 |

FOREIGN PATENT DOCUMENTS

WO    WO-2010/104434 A1    9/2010

OTHER PUBLICATIONS

"Draft Standard for Local and Metropolitan Area Networks—Media Access Control (MAC) Bridges and Virtual Bridged Local Area Networks-Amendment 8: Shortest Path Bridging", IEEE P802.1aq/D4.5, Feb. 6, 2012, 359 pages.
Allan D. et al., "Provider Link State Bridging", Sep. 1, 2008, IEEE Communications Magazine, vol. 46, No. 9, 8 pages.
IEEE Std 802.1 Qay-2009, IEEE Standard for Local and metropolitan area networks—downloaded from http://standards.ieee.org/getieee802/download/802.1 Qay-2009.pdf Virtual Bridged Local Area Networks, Amendment 10: Provider Backbone Bridge Traffic Engineering, Aug. 5, 2009, IEEE, New York, New York, 145 pages.

(Continued)

*Primary Examiner* — Marcus R Smith

(57) ABSTRACT

A three stage folded Clos network is used for Ethernet routing with improved efficiency for computational complexity, network administration, multicast addressing and load redistribution upon failure. The network includes an array of root nodes coupled to an array of edge nodes. Forwarding states are computed and installed for spanning trees rooted on the root nodes. When an edge node is identified as having a failed connection to a root node, a shortest path first (SPF) tree rooted on that edge node is constructed for each Backbone VLAN identifier (B-VID) for the spanning trees rooted on that root node and use the failed connection. A filtering database in each node is populated for edge node pairs having a common service identifier, and unicast and multicast data are forwarded between the edge node pairs according to the filtering database via the SPF trees using a hybrid multicast addressing.

27 Claims, 13 Drawing Sheets

(56) References Cited

OTHER PUBLICATIONS

Allan D. et al., "IEEE 802.1aq in a Nutshell: Antecedents and Technology", 2012, 802.1aq Shortest Path Bridging Design and Evolution: The Architect's Perspective, First Edition, Chapter 1, the Institute of Electronics Engineers, John Wiley & Sons, Inc. Electrical and Electronics Engineers, John Wiley & Sons, Inc., 35 pages.

Allan D. et al., "Shortest Path Bridging: Efficient Control of Larger Ethernet Networks," Oct. 2010, IEEE Communications Magazine, 8 pages.

Ashwood-Smith P., "Shortest Path Bridging IEEE 802.1aq", Tutorial and Demo, Oct. 2010, 61 pages.

D. Fedyk et al., "IS-IS Extensions Supporting IEEE 802.1aq Shortest Path Bridging,draft-ietf-isis-ieee-aq-05.txt," Mar. 8, 2011, Network Working Group, Internet Draft, IETF Trust, downloaded from http://tools.ietf.org/html/draft-ietf-isis-ieeeaq-05, 41 pages.

\* cited by examiner

THREE STAGE FOLDED CLOS OPTIMIZATION FOR 802.1AQ

FIELD OF THE INVENTION

Embodiments of the invention relate to the field of computer networking; and more specifically, to the optimization of Ethernet routing in a three stage folded Clos network.

BACKGROUND

The IEEE 802.1aq standard (also referred to 802.1aq hereinafter), published in 2012, defines a routing solution for the Ethernet. 802.1aq is also known as Shortest Path Bridging or SPB. 802.1 aq enables the creation of logical Ethernet networks on native Ethernet infrastructures. 802.1aq employs a link state protocol to advertise both topology and logical network membership of the nodes in the network. Data packets are encapsulated at the edge nodes of the networks implementing 802.1aq either in mac-in-mac 802.1ah or tagged 802.1Q/p802.1ad frames and transported only to other members of the logical network. Unicast and multicast are also supported by 802.1 aq. All such routing is done via symmetric shortest paths. Many equal cost shortest paths are supported. Implementation of 802.1 aq in a network simplifies the creation and configuration of the various types of network including provider networks, enterprise networks and cloud networks. The configuration is comparatively simplified and diminishes the likelihood of error, specifically human configuration errors.

SUMMARY

An embodiment of a method is implemented in a three stage folded Clos network used for Ethernet routing with improved efficiency for computational complexity, network administration, multicast addressing and load redistribution upon failure. The network includes an array of root nodes coupled to an array of edge nodes that have user-facing input and output ports. Each node in the network computes and installs forwarding state for spanning trees rooted on the root nodes. Data forwarding in the spanning trees utilizes any source multicast addresses for multicast paths when there is no failure in the network, as this scales in linear proportion to the number of multicast groups and not the combinatorial product of the number of nodes participating in a service times the number of multicast groups. When a given edge node is identified as having a failed connection to a given root node, each node in the network computes a shortest path first (SPF) tree rooted on that given edge node for each B-VID for the spanning trees rooted on the given root node and use the failed connection, where the SPF tree serves as a prototype for unicast and multicast connectivity to that given edge node for that B-VID. A filtering database in each node is populated for pairwise connectivity between the given edge node and the other edge nodes where they have services in common that are associated with the displaced B-VID, and the nodes install unicast state in the filtering database, and also install multicast state in the filtering database using a hybrid of multicast addressing, which is selected depending on whether traffic is directed to the given edge node, or from the given edge node. Each node then uses its forwarding database to forward unicast and multicast data in the network.

The embodiment described above is a distributed routing system where each node computes its forwarding tables in the filtering database. In an alternative embodiment, a centralized controller performs a system management function that computes the forwarding tables. The forward tables are then downloaded into each node for the nodes to perform data forwarding.

An embodiment of a network element functioning as an edge node is implemented in a three stage folded Clos network used for Ethernet routing with improved efficiency for multicast addressing and load redistribution upon failure. The edge node includes a first set of user-facing input and output ports, a second set of input and output ports coupled to a plurality of root nodes, memory to store a filtering database, and a network processor configured to: compute and install forwarding states for spanning trees rooted on the root nodes, wherein data forwarding in the spanning trees utilizes any source multicast addresses for multicast paths when there is no failure in the network; identify a given edge node as having a failed connection to a given root node; construct a SPF tree rooted on the given edge node for each B-VID for the spanning trees rooted on the given root node and use the failed connection, where the SPF tree serves as a prototype for unicast and multicast connectivity to that given edge node; populate a filtering database for pairwise connectivity between the given edge node and the other edge nodes where they have services in common associated with the displaced B-VID, install unicast state in the filtering database, and install multicast state in the filtering database using a hybrid of multicast addressing, which is selected depending on whether traffic is directed to the given edge node, or from the given edge node. The forwarding database is then used to forward unicast and multicast data in the network.

An embodiment of a system is implemented in a three stage folded Clos network used for Ethernet routing with improved efficiency for multicast addressing and load redistribution upon failure. The system includes root nodes coupled to edge nodes that have a set of user-facing input and output ports. Each of the edge node and the root node includes memory to store a filtering database, and a network processor configured to: compute and install forwarding states for spanning trees rooted on the root nodes, wherein data forwarding in the spanning trees utilizes any source multicast addresses for multicast paths when there is no failure in the network; identify a given edge node as having a failed connection to a given root node; construct a SPF tree rooted on the given edge node for each B-VID for the spanning trees rooted on the given root node and use the failed connection, where the SPF tree serves as a prototype for unicast and multicast connectivity to that given edge node for that B-VID; populate a filtering database for pairwise connectivity between the given edge node and the other edge nodes where they have services in common that are associated with the displaced B-VID, install unicast state in the filtering database, and install multicast state in the filtering database using a hybrid of multicast addressing, which is selected depending on whether traffic is directed to the given edge node, or from the given edge node. The forwarding database is then used to forward unicast and multicast data in the network.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
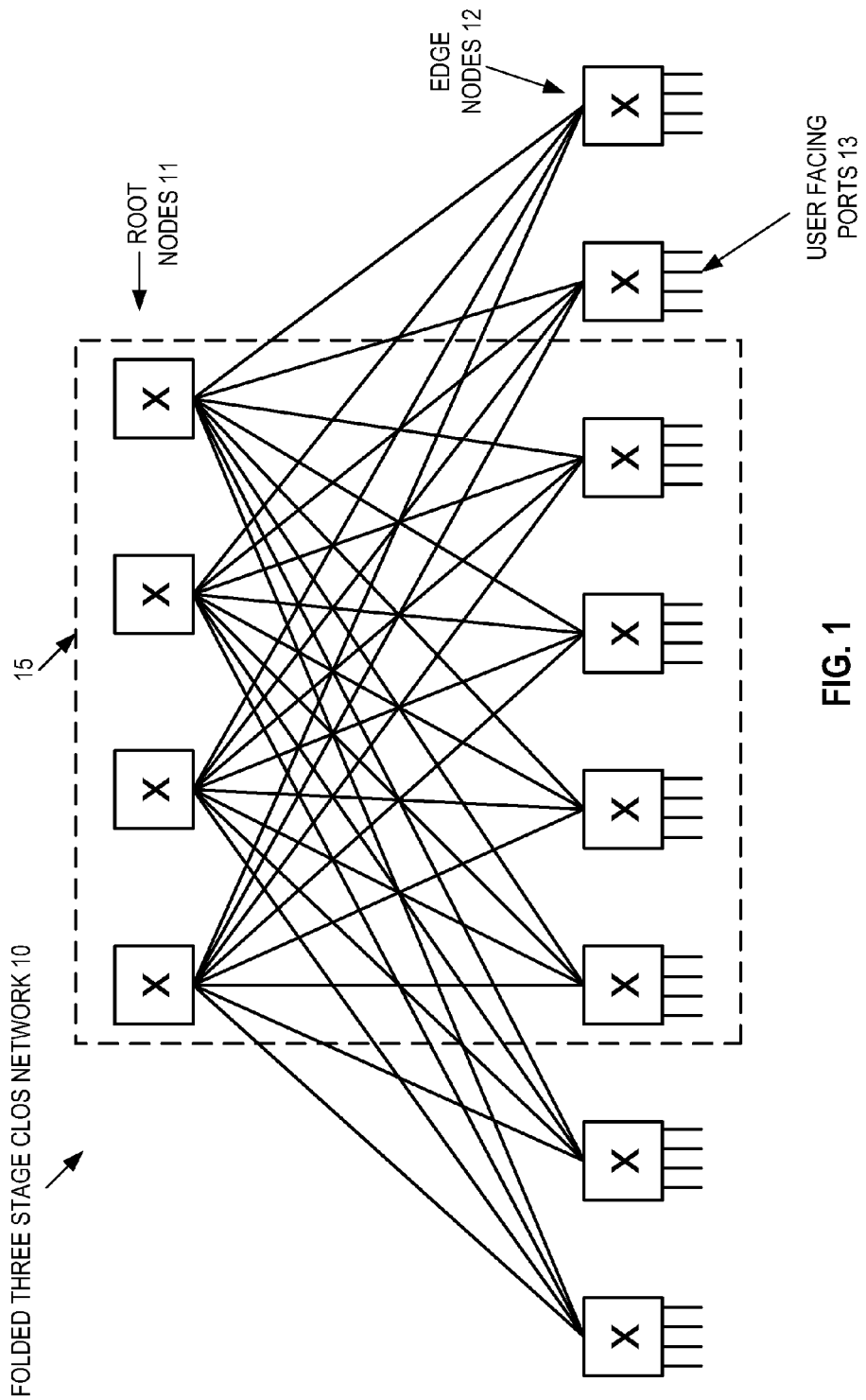
FIG. 1 illustrates an example of a three stage folded Clos network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

In IEEE 802.1aq networks, a link state protocol is utilized for controlling the forwarding of Ethernet frames on the network. One link state protocol, the Intermediate System to Intermediate System (IS-IS), is used in 802.1aq networks for advertising both the topology of the network and logical network membership.

802.1aq has two modes of operation. A first mode for Virtual Local Area Network (VLAN) based networks is referred to as shortest path bridging VID (SPBV). A second mode for MAC based networks is referred to as shortest path bridging MAC (SPBM). Both SPBV and SPBM networks can support more than one set of equal cost forwarding trees (ECT sets) simultaneously in the dataplane. An ECT set is commonly associated with a number of shortest path VLAN identifiers (SPVIDs) forming an SPVID set for SPBV, and associated 1:1 with a Backbone VLAN ID (B-VID) for SPBM.

According to 802.1aq MAC mode, network elements in the provider network are configured to perform multipath forwarding traffic separated by B-VIDs so that different frames addressed to the same destination address but mapped to different B-VIDs may be forwarded over different paths (referred to as "multipath instances") through the network. A customer data frame associated with a service is encapsulated in accordance with 802.1aq with a header that has a separate service identifier (I-SID) and B-VID. This separation permits the services to scale independently of network topology. Thus, the B-VID can then be used exclusively as an identifier of a multipath instance. The I-SID identifies a specific service to be provided by the multipath instance identified by the B-VID. The actual routing of multipath instances in an 802.1aq network is determined by tie breaking based on each node's system IDs.

802.1aq can be used for Ethernet routing in a Wide Area Network (WAN) or within a data center, such as a cloud computing data center. The network within a data center typically has a highly regular structure, such as the topology of a Clos network. A Clos network includes arrays of switching nodes. An example of a Clos network is a three stage folded Clos network, which has an ingress stage, a middle stage and an egress stage, and where the network is folded midway across the middle stage of nodes, such that the ingress stage is merged into the egress stage. Each data frame entering a node in the ingress stage can be routed through any of the available middle stage node to reach a destination egress stage node.

A number of techniques have been developed for maintaining connectivity in a Clos network having a failed node or link. According to 802.1aq, a failure of a node or link can be observed by one or more surrounding nodes and advertised throughout the network by the routing system. Each node in the network will recalculate a new path for the traffic affected by the failure, and forwarding will automatically continue using the new path.

Unlike the application of spanning trees to an arbitrary topology which results in non-optimal forwarding paths, in a fault free Clos network, the connectivity provided by multiple spanning trees rooted on the second tier nodes (i.e., the nodes in the middle stage) would be identical to that based on shortest path trees. Not only is this simpler in terms of the computational complexity of the routing problem, but also permits a more scalable multicast addressing format to be used. However the distribution of traffic when a link fails such that a second tier node has incomplete connectivity is problematic and may result in reverting to shortest path tree operation, and require the use of less scalable multicast addressing.

Moreover, according to 802.1aq, displaced traffic is shifted to a failover path as a block when there is a failure. Traffic redistribution as a block may decrease the stability of the network, as the failover path now processes a significant increase in traffic, which can significantly degrade its performance. Further, this block shift of traffic to a failover path can so overwhelm links and nodes in the failover path as to effectively make those elements fail. It would be desirable to modify the base specification 802.1aq behavior to apply a multipathing technique that maximized multicast address scalability, minimized computational complexity, simplifies multipathing design in the network by providing a distributed spanning tree root election mechanism that had commonality with multipath path selection in failure scenarios, and provided for fairer distribution of the degradation of network capacity in failure scenarios.

The embodiments described herein utilize a network topology that has a flattened switching hierarchy, such as a three stage folded Clos network. A three stage folded Clos network is a three stage Clos network folded midway across the middle stage of nodes, such that the ingress stage is merged into the egress stage. The merged ingress/egress stage includes an array of edge nodes (also referred to as the first tier nodes), and the middle stage includes an array of root nodes (also referred to as the second tier nodes). When a failure occurs to one or more links connecting to the root node, it is possible to postulate a specialized solution instead of continuing to use the root for all connectivity resulting in an unnecessarily long forwarding path, or reverting to an "all pairs" computation; a shortest path first (SPF) tree is generated for each edge node that normally has a direct adjacency with the root over a failed link for the B-VID, where the SPF tree is rooted on an edge node. There is no "all pairs" computation where spanning trees are generated for all root nodes except for the failed root node; instead, for the failure of a root node or one or more links connecting to a root node, only one SPF tree per B-VID is generated. Thus, computational load is significantly diminished in the event of a failure involving a root node.

The embodiments described herein utilize a variation of the combination of 802.1 aq tiebreaking path selection technique augmented with the split tiebreaking mechanism to select the roots of spanning trees on which data frames traverse for each ECT set. In one embodiment, the root for a spanning tree is the root node with the lowest system ID after masking with an XOR mask value associated with a B-VID and the network has been administered to ensure that the second tier nodes in the Clos will consistently have the lowest system IDs in tiebreaking when compared to the system IDs assigned to the edge nodes. Each node in the Clos network has multiple system IDs in multiple system ID sets used for tiebreaking. These system ID sets and mask values enable the distributed and independent selection of multiple spanning tree roots and provide a simple approach to load spreading in a data center. The second best choice of the spanning tree root (e.g., the root node with the second lowest system ID after the XOR masking) a different second tier node in each system ID set. Thus, when a failure occurs to a second tier node, the set of spanning trees rooted on that node can be distributed across more than one other second tier node.

For a folded Clos network, spanning trees rooted on root nodes provides the same connectivity as equal cost trees rooted on edge nodes. However, there are a number of advantages to using spanning trees over equal cost trees. The use of spanning trees permits the use of "any source" multicast addressing, which significantly reduces multicast states in the network. In comparison, equal cost trees that use "source specific" multicast addressing result in an order (S) more multicast addresses in the switch filtering databases, where (S) is the number of multicast source nodes for a given multicast group.

Further, the embodiments described herein utilize three forms of backbone destination MAC addresses in constructing multicast connectivity, which include 802.1 aq multicast MAC addressing (also referred to as the "source specific" multicast addressing or (S,G) addressing), 802.1ah multicast MAC addressing (also referred to as the "any source" multicast addressing or (*,G) addressing) and re-use of existing backbone unicast tunneling. In the embodiments, a "split horizon" tree approach is developed to deal with partial severing of a root node. The nodes attached to the failed adjacency use a different form of addressing than the nodes that are not. The nodes attached to the failed adjacency can use (*,G) addressing while the nodes not directly attached to the failed adjacency in the ECT set bi-cast broadcast/unknown/multicast (BUM) data frames using a hybrid of (*,G) and (S,G) (or unicast) addressing.

The hybrid addressing style described herein improves network scalability by reducing the multicast states retained in the nodes. According to 802.1 ah, the backbone destination MAC address for (*,G) multicast is encoded as a concatenation of a fixed Organizationally Unique Identifier (OUI) (representing *, the set of all sources for the I-SIDs) and a service identifier such as I-SID (representing G). According to 802.1aq, the backbone destination MAC address for (S,G) multicast is encoded as a concatenation of the multicast tree root (representing S) and a service identifier such as I-SID (representing G). For unicast where there is a single receiver, the backbone destination MAC address is a fix-length bit value, e.g., a 46-bit value. (*,G) multicast trees can be used by any source node to reach all receivers in G and depend on split horizon such that any individual source does not see it's own traffic. (S,G) multicast trees are required for shortest path trees where split horizon is not possible due to a FDB conflict as the trees are not co-routed for all "S", and can be used by a single source to reach the set or a subset of receivers in G as the trees can be personalized for each "S". Therefore, multiple (S,G) trees are required to construct the equivalent of a (*,G) tree, and as a result these multiple (S,G) trees require more states in the root nodes to effectively do the same thing as one (*,G) multicast tree. Unicast is used where there is a single receiver in a node group (G). Unicast adds no state as the unicast forwarding path exists independently from the service specific multicast tree. Therefore, it is beneficial to use unicast over (S,G) where (*,G) is not or cannot be used.

Although specific versions of standards are described herein, embodiments of the invention are not limited to an implementation based on the current versions of the standards as they may be adapted to work with future versions of the standards when they are developed. Similarly, embodiments of the invention are not limited to an implementation that operates in connection with one of the particular protocols described herein as other protocols may be used in an Ethernet multi-area routing network as well.

FIG. 1 is a diagram of an example network topology of a three stage folded Clos network 10. The nodes in the folded ingress/egress stage (bottom stage as shown) are referred to as the edge nodes 12, and the nodes in the middle stage (top stage as shown) are referred to as the root nodes 11. The root nodes 11 and edge nodes 12 are collectively referred to as "nodes." Each node 11, 12 is a switching element that cross-connects all of its input ports to its output ports. The network is three stage because the maximum number of nodes traversed by a frame is three (i.e., edge to root to edge). Each root node 11 is connected to all of the edge nodes 12. Each root node 11 includes a number of input/output ports for sending to and receiving from the edge nodes 12, and each edge node 12 also includes a number of input/output ports for sending to and receiving from the root nodes 11. Additionally, each edge node 12 also includes a number of user-facing input/output ports 13 for receiving and transmitting traffic from/to outside the network 10.

The example network of FIG. 1 is built out of nodes of identical capacity and includes four root nodes 11 interconnecting eight edge nodes 12. Different numbers of root nodes 11 and edge nodes 12 may be included in different embodiments. In one embodiment, the network 10 is within a data center. In one embodiment, each root node 11 is a Backbone Core Bridge (BCB) and each edge node 12 is a Backbone Edge Bridge (BEB).

In general, the non-blocking characteristics of a three stage folded Clos network can be determined by the number of ports in its root nodes and edge nodes. For example, the maximum number of root nodes 11 in a non-blocking Clos network is the number of ports per node divided by two, and the number of user-facing ports 13 in the edge node 12 is the number of root nodes multiplied by the number of ports per node.

Figure 2:
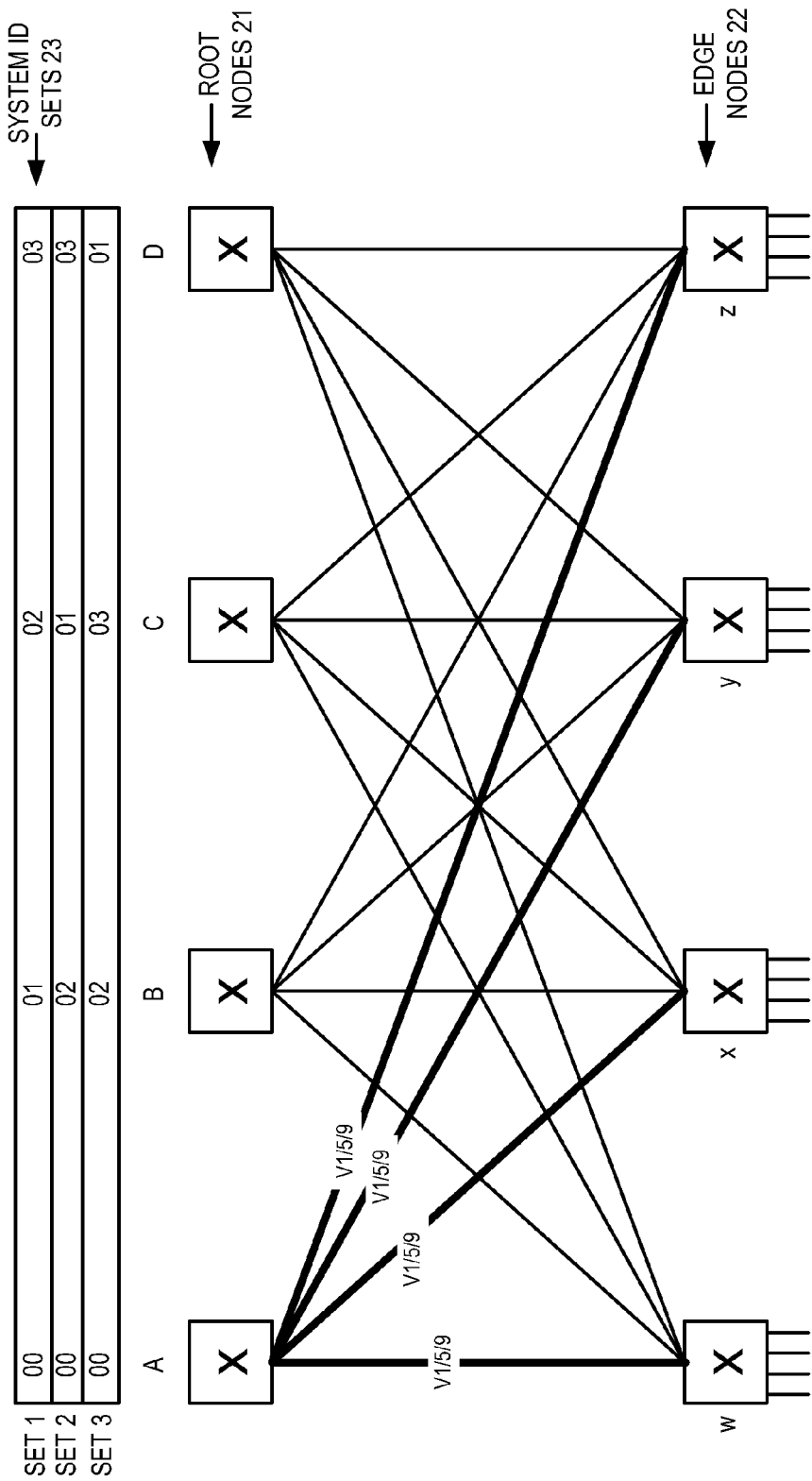
FIG. 2 illustrates an example of system ID sets assigned to root nodes.

For the sake of simplicity, the following description uses a portion of the network 10 as shown in the dotted box 15 as the underlying network. It is understood that the techniques can apply to a three stage folded Clos network with a different numbers of root nodes and edge nodes. As shown in the embodiment of FIG. 2, the root nodes 21 are labeled with A, B, C and D, the edge nodes 22 labeled with w, x, y and z. In one embodiment, the root nodes 21 are assigned multiple system ID sets (e.g., set 1, set 2 and set 3), each system ID set including a distinct system ID for every root node 21. The system IDs for the same root node 21 in different system ID set can be the same or different; for example, node A has system IDs 00, 00, 00 in the three system ID set, respectively, and node B has 01, 02, 02 in the three system ID set, respectively.

The use of multiple system ID sets allows split tiebreaking when selecting a root node of a spanning tree for a B-VID. According to the split tiebreaking mechanism to be described in detail with reference to FIG. 3, the spanning trees for B-VIDs 1, 5, 9 (shown as v1/5/9) are rooted on node A. Although not shown in FIG. 2, root node B is the root of the spanning trees for B-VIDs 2, 6, 10, root node C is the root of the spanning trees for B-VIDs 3, 7, 11, and root node D is the root of the spanning trees for B-VIDs 4, 8, 12. Thus, a data frame carrying B-VID 1, 5 or 9 in the header can enter the network from any of the edge nodes, transit root node A, and exit through any of the other edge nodes. If node A fails or any of the labeled links fails, the affected traffic can be redistributed to other links via other root nodes. In a fault free scenario, each of the edge nodes w, x, y and z forwards data frames using 802.1ah "any source" multicast MAC (*,G) addressing to reach the other edge nodes. It is noted that customer layer traffic is either broadcast, unicast or multicast at that layer distinct from however it was forwarded in the backbone layer.

Figure 3:
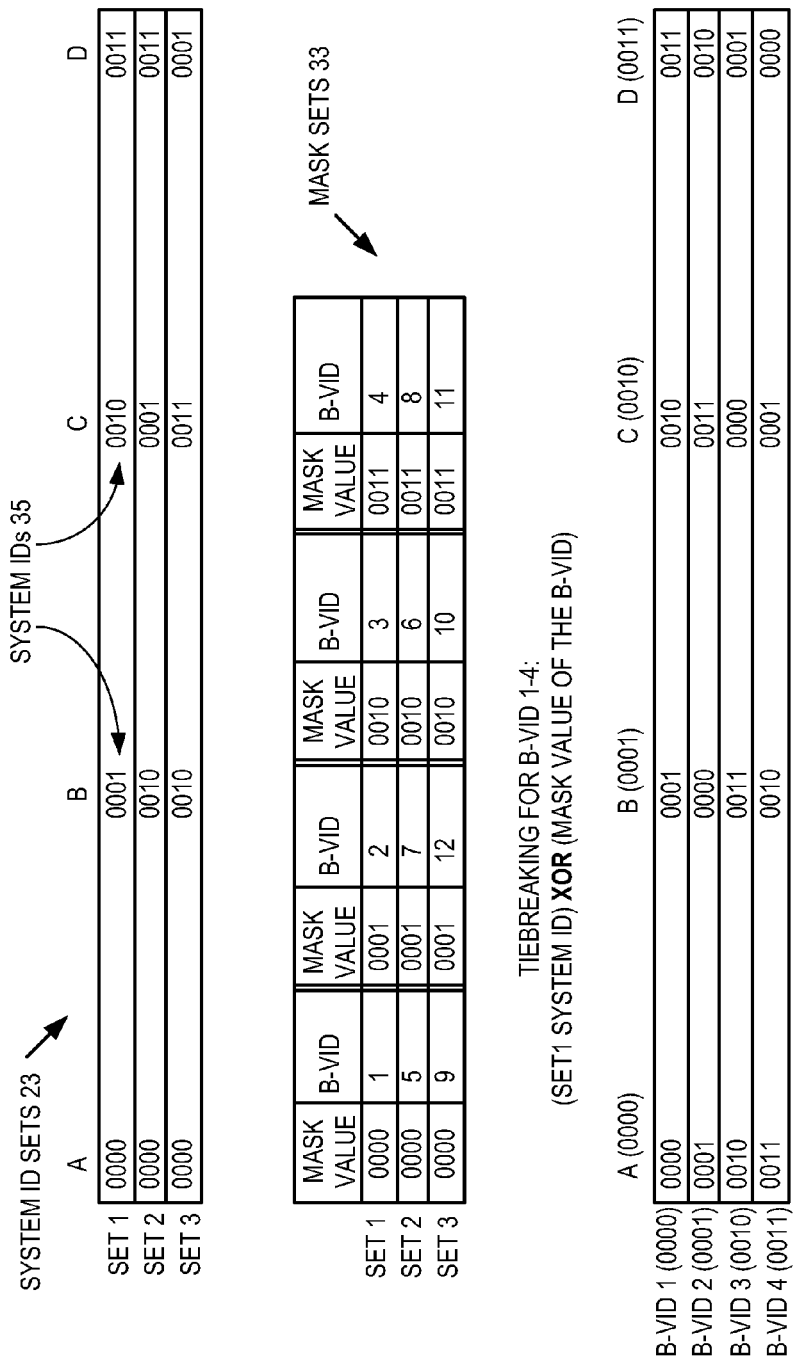
FIG. 3 illustrates an example of a split tiebreaking mechanism used for spanning tree root selection.

FIG. 3 illustrates an embodiment of a split tiebreaking mechanism used for spanning tree root selection. Before describing the split tiebreaking mechanism, it is useful to explain the tiebreaking mechanism defined in 802.1 aq. 802.1 aq normally generates full meshes of symmetrically congruent shortest path trees rooted from each source of traffic in the network. One such full mesh is known as an Equal Cost Tree (ECT) set. An ECT set is normally associated with a B-VID. When path computation as part of a generation of an ECT set results in a need to select from more than one equal cost path, 802.1aq uses a lexicographic ordering of the node IDs to construct a unique path ID for each equal cost path, sorts the set of path IDs and selects the lowest value. Additionally, 802.1aq specifies a means for generating multiple ECT sets via XORing a set value associated with each ECT set with the node IDs, revising the lexicographic ordering of the node IDs in each path ID, re-ranking the path IDs and again selecting the lowest value.

The split tiebreaking mechanism described herein is an improvement over 802.1aq. The split tiebreaking mechanism enables a more even distribution of traffic across the set of root nodes in a Clos network not only in a fault-free scenario but also when one or more root nodes fail. The split tiebreaking mechanism uses a number of design elements as follows. (1) The number of spanning trees to be instantiated is selected to be some integer multiple of the number of root nodes. That multiple is greater than one if it is desired to leverage the properties of split tiebreakers during failures. (2) The root node IDs (i.e., system IDs) is designed such that in a fault-free Clos network an equal number of spanning trees is rooted on each root node. (3) The edge node IDs are designed such that each edge node will never be a spanning tree root. This can be achieved by simply using a non-zero value in the upper bits of the edge node IDs, while the root node has zero in the upper bits such that min_value(set of edge node IDs)>max_value (set of root node IDs). (4) If the multiple is greater than one in (1), the split tiebreaker values are designed such that the spanning tree roots of a failed root node are distributed across more than one other root node.

In the embodiment of FIG. 3, the system IDs in the system ID sets 23 are shown in binary. In addition, each B-VID in the network is assigned a mask value and a system ID set number, such as the example shown in a mask set 33. To determine the root node for each of B-VIDs 1-4, which belongs to the system ID set 1, a transformation is performed on the system ID set 1 using the corresponding mask values of B-VID 1-4. In one embodiment, the root node having the lowest system ID after the transformation (using a given mask) is the root of the spanning tree for the B-VID associated with the given mask. In one embodiment, the transformation is an XOR operation. For example, for B-VID 1 with a mask value 0000, an XOR is performed on the mask value 0000 and each of the system IDs in set 1: 0000, 0001, 0010, 0011. The results of the XOR (which are the transformed system IDs) are 0000, 0001, 0010 and 0011. In one embodiment, the root node that results in the lowest XOR value is selected as the root of the spanning tree for the corresponding B-VID. Thus, for B-VID 1, the root node is node A as the XOR result 0000 is the lowest among the four.

In the event of a failure to node A, the traffic transiting node A can be re-routed to another root node according to the XOR results computed above. For example, the root node that results in the next lowest XOR value can be selected as the new transit root node; i.e., node B. Therefore, the XOR results computed above determine a failover ordering for B-VID 1.

Similarly, the root selection for B-VIDs 5-8 and B-VIDs 9-12 can be performed with the same split tiebreaking mechanism. As B-VIDs 1-4, B-VIDs 5-8 and B-VIDs 9-12 are in different sets, the mask values and system IDs in each set can be configured independently of other sets. In one embodiment, a management system can configure each root node with system IDs and their corresponding system ID sets. The management system can also assign the mask values for the B-VIDs used in the network. The system set ID number (e.g., set 1, set 2 or set 3) and the mask value for each B-VID can be exchanged among the nodes via an augmented Intermediate System to Intermediate System (IS-IS) hello procedure, or can be loaded into each node as configuration data by a management system.

Figure 4:
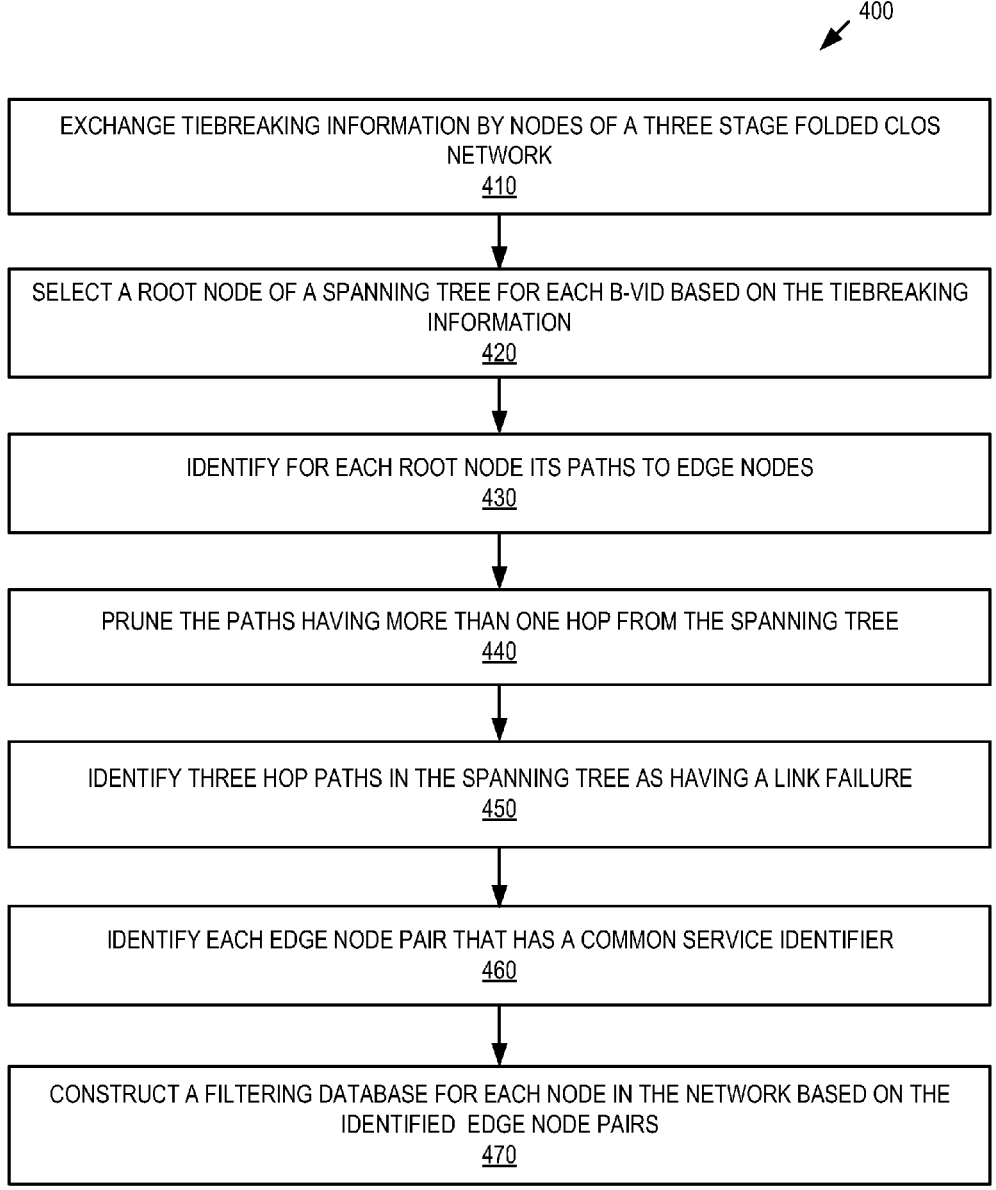
FIG. 4 illustrates an embodiment of a method of computing and installing forwarding states for spanning trees in a three stage folded Clos network.

FIG. 4 is a flow diagram illustrating an embodiment of a method 400 for computing and installing forwarding states for spanning trees in a three stage folded Clos network. In one embodiment, the tiebreaking information is exchanged among the nodes using an augmented IS-IS hello procedure (block 410). The augmented IS-IS procedure can be used to exchange, for each B-VID, the path generation algorithm (e.g., spanning tree or equal cost tree), the system ID set for root selection, and the mask value for the B-VID. For example, an IS-IS speaker associated with a node can advertise the following: for B-VID 1, use spanning tree, use system ID set 1 for root selection, and mask value=00; for B-VID 2, use spanning tree, use system ID set 1 for root selection, and mask value=01, etc. In an alternative embodiment, the tiebreaking information can be configured into each node by a management system. After obtaining the tiebreaking information, a root node of a spanning tree is selected for each B-VID based on the tiebreaking information (block 420). The root selection is performed by a system ID transformation, as described in FIG. 3, such that the root node having the lowest system ID among all root nodes is selected as the root for a spanning tree identified by a given B-VID. After the root selection, for each root node, its paths to the edge nodes are identified (block 430). In one embodiment, the paths are computed by each node in the network using a Dijkstra algorithm; alternatively, different algorithms can be used.

In an embodiment where the Dijkstra algorithm is used, the result of the computation can be used to modify forwarding to circumvent the effects of a link failure. The computation is performed in a distributed fashion by each node in the network and results of the computation can be used by nodes independent of their locations in the network. Thus, a node does not need to be next to a failed link in order to use this information, as the node takes global topology knowledge and computes the local personalization of that information. The Dijkstra algorithm generates a prototype tree, in which each one hop path is from a root node to an edge node, which can be kept in the tree. Those paths having more than one hop can be pruned from the tree (block 440). For example, there may be two hop paths, which are from root to edge to root. These paths can be pruned from the prototype tree. Three hop paths are identified as an indication of a link failure (block 450). The starting point of a three hop path is the root of the spanning tree, and the end point is an edge node that cannot be directly reached by the root. Thus, the three hop paths indicate that edge originated traffic cannot traverse the root of the spanning tree and has to traverse another root to get to the edge node. Thus, these three hop paths can also be pruned from consideration, and a new root is needed for that B-VID and the edge node coupled to the failed link. The list of nodes reached by three hop paths is retained separately for future computation as the set of edge nodes no longer directly attached to the root. Further, four hops or greater paths mean that the network has pathologically failed. It is noted that the path pruning and failure detection described above are merely examples and optimizations may exist.

After generation of the spanning tree, each pair of edge nodes for the B-VID that has a common service identifier associated with the B-VID is identified (block 460). When an edge-edge node pair is identified, their respective filtering database (FDB) is constructed to include a forwarding entry (also referred to as a forwarding state) for forwarding unicast and multicast data frames between the node pair (block 470). These data frames will include an I-SID in their headers to identify a corresponding service provided by the network. For an edge node, the FDB entries can be generated by pointing the I-SID multicast addresses at the spanning tree root as well as the nodal unicast Backbone MAC (B-MAC) address of the edge node. For a root node, the FDB entries can be generated by cross-connecting the multicast entries to the pair of edge nodes as well as the nodal unicast B-MAC of the root node. The operations of block 430 to block 470 are repeated for each root of the spanning trees.

Figure 5:
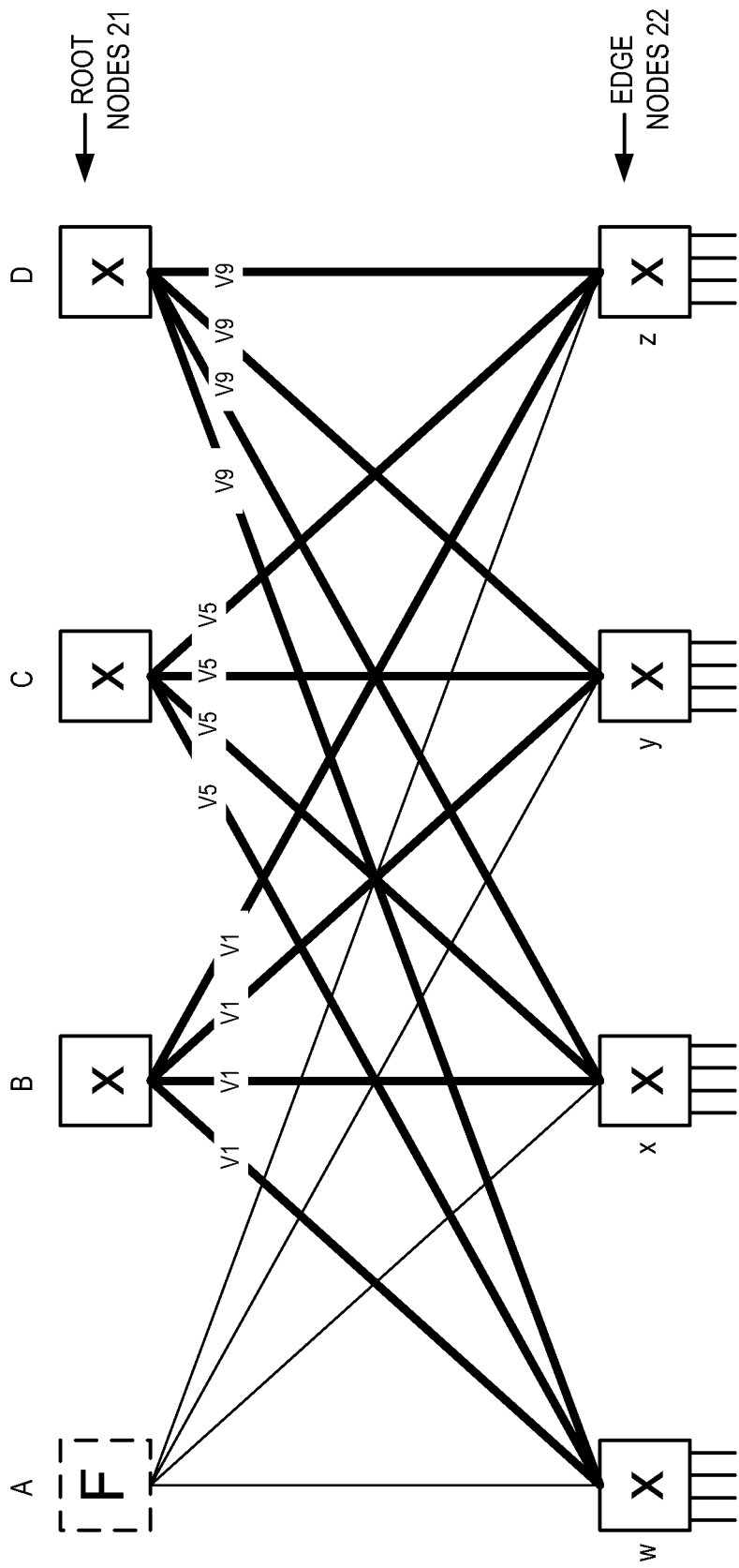
FIG. 5 illustrates a scenario in which a root node fails according to an embodiment.

FIG. 5 shows an embodiment of the network of FIG. 2 in which one root node (e.g., node A) fails (indicated by "F"). By using the split tiebreaking mechanism described in FIG. 3, the workload of data forwarding on node A can be shifted to the other nodes that have the second lowest XOR results (0001 in binary) for B-VIDs 1, 5 and 9. Therefore, nodes B, C and D become the spanning tree roots for B-VIDs 1, 5 and 9 respectively. The shift of workload does not change the multicast addressing used by the edge nodes. Thus, the edge nodes w, x, y and z continue forwarding multicast data frames using 802.1ah "any source" multicast MAC (*,G) addressing (also referred to as the (*,G) addressing for simplicity) to the other edge nodes.

FIGS. 6-11 illustrate a number of scenarios in an example three stage folded Clos network in which one or more links fail. Link failure may be detected when generating the spanning trees as described in block 450 of FIG. 4, where the Dijkstra algorithm is used for computing the paths from a spanning tree root to the edge nodes. As shown in block 450 of FIG. 4, a three hop path in the spanning tree is indicative of a link failure and the affected nodes. It is understood that other methods can also be used for detecting the consequences of node or link failures in a three stage folded Clos network.

Figure 6:
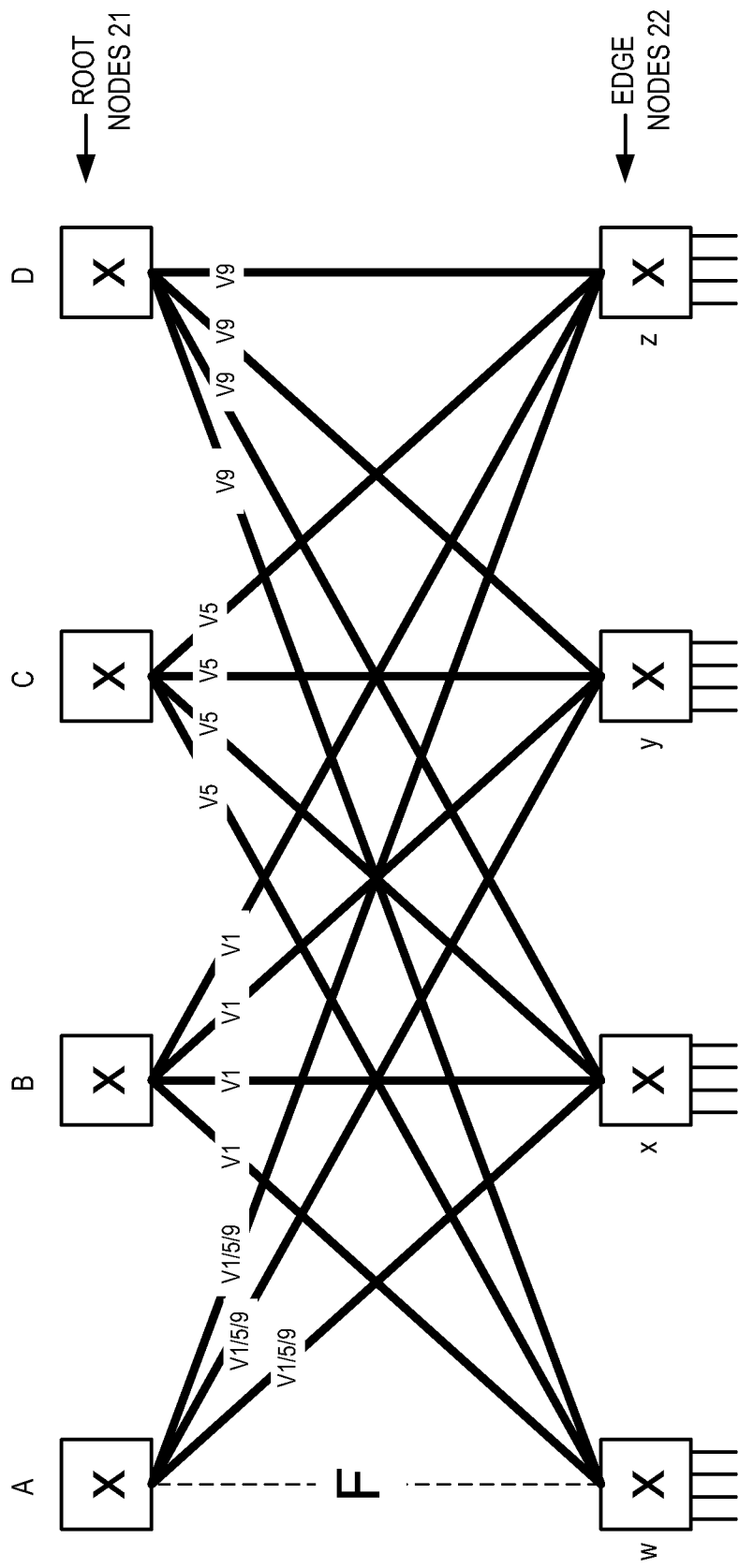
FIG. 6 illustrates a scenario in which a link fails according to an embodiment.

FIG. 6 shows a scenario in which a failure occurs to the link between node A and node w. When the spanning tree for node A is computed, node w emerges as being served by a three hop path. Upon identifying the link failure, a shortest path first (SPF) tree rooted on node w is constructed for each B-VID that uses the failed link. Via a link state routing protocol such as IS-IS, each node learns the topology information in the network and uses this information for computing the SPF tree. In one embodiment, the SPF tree can be computed by each node using the Dijkstra algorithm. These nodes construct the same view of the network based on the topology information.

In one embodiment, the construction of the SPF trees includes the use of previously described split tiebreaking mechanism to determine which root node to transit. It is noted that the roots of these SPF trees are the edge nodes of the network; the root nodes of the network become the transit nodes of the SPF trees. After the SPF trees are constructed, the edge nodes identify the intersection of I-SIDs (i.e., the common I-SIDs) shared by edge-edge node pairs for the B-VID. Based on the identified edge node pairs, each node populates its FDB for subsequent data forwarding.

In the example of FIG. 6, the SPFs built for B-VIDs 1, 5 and 9 are shown as the links labeled with v1, v5 and v9, respectively. The links connecting to nodes x, y and z with the label v1/5/9 are failure-free, and therefore can continue to be used by nodes x, y and z to forward data amongst themselves using the (*,G) addressing. However, to communicate with node w, nodes x, y and z need to use the SPF tree links labeled with v1, v5 and v9. Thus, in one embodiment, a hybrid multicast addressing is used by the edge nodes: nodes x, y and z use unicast or the 802.1aq "source specific" multicast MAC (S,G) addressing (also referred to as the (S,G) addressing for simplicity) to forward multicast data to node w, augmenting the connectivity used between x, y, and z; while node w uses the 802.1ah multicast MAC (*,G) addressing to forward multicast data to nodes x, y and z. This is because multicast from node w needs to reach all peers, and multicast from x, y and z needs distinct treatment to reach node w separately from how they multicast to each other.

The same principle is applied to each of the following examples shown in FIGS. 7-11; that is, when an edge node is reachable from a spanning tree only by a three hop path, compute an SPF tree from this node, forward multicast data from this node using the (*,G) addressing, and forward multicast data to this node using unicast or the (S,G) addressing.

Figure 7:
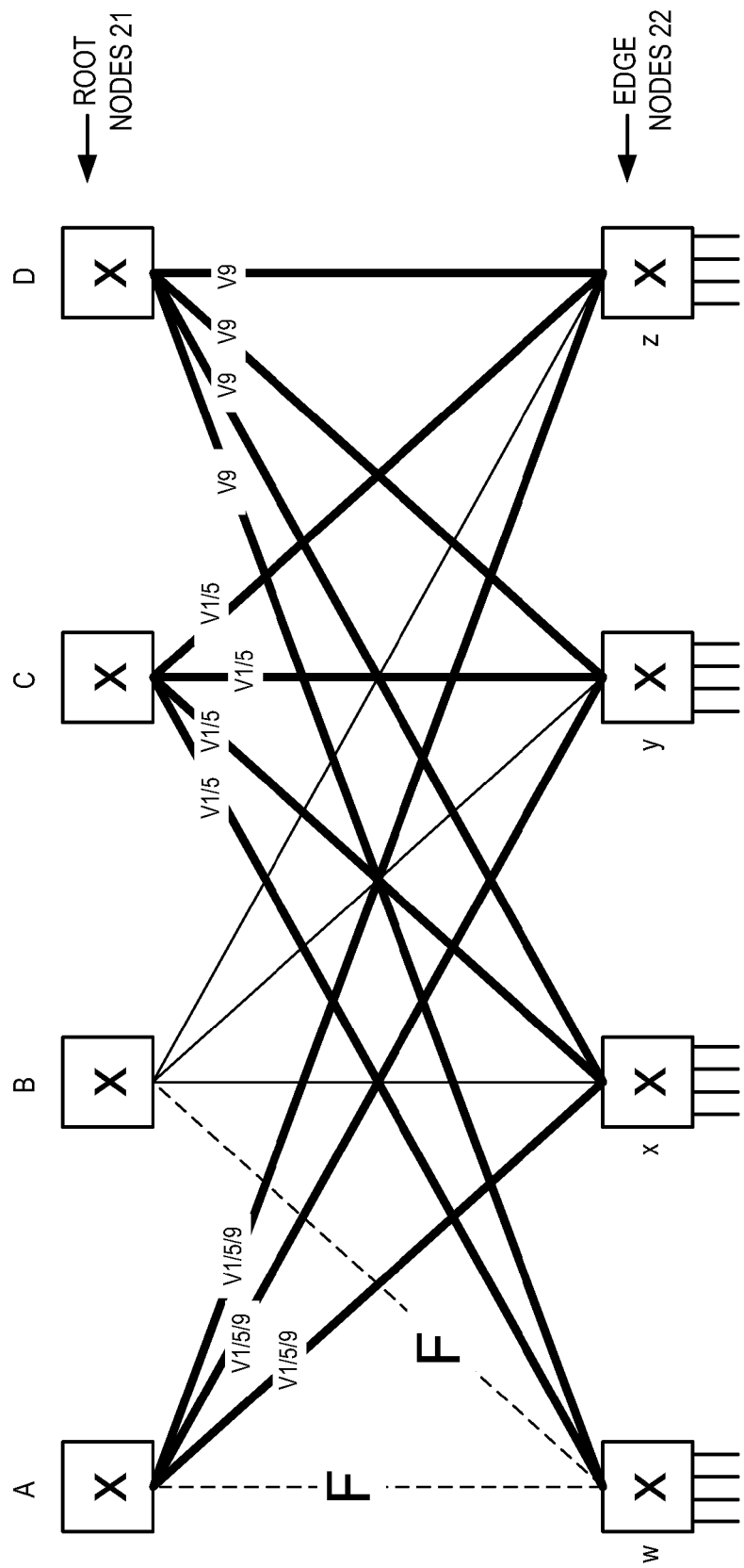
FIG. 7 illustrates a first scenario in which two links fail according to an embodiment.

FIG. 7 illustrates another scenario in which two links connecting to node w fail. In this scenario, as the SPF tree for B-VID 1 (which is rooted on node w) can no longer transit nodes A and B, node C is used as the transit node (e.g., by tiebreaking). The SPF tree for B-VID 5 and B-VID 9 can still transit nodes C and D, respectively. The addressing scheme on the v1/5/9 links is still the (*,G) addressing. However, to communicate with node w, nodes x, y and z need to use the SPF tree links labeled with v1/5 (representing v1 and v5) and v9. Thus, in one embodiment, nodes x, y and z use unicast or the (S,G) addressing to forward multicast data to node w, while node w uses the (*,G) addressing to forward multicast data to nodes x, y and z.

Figure 8:
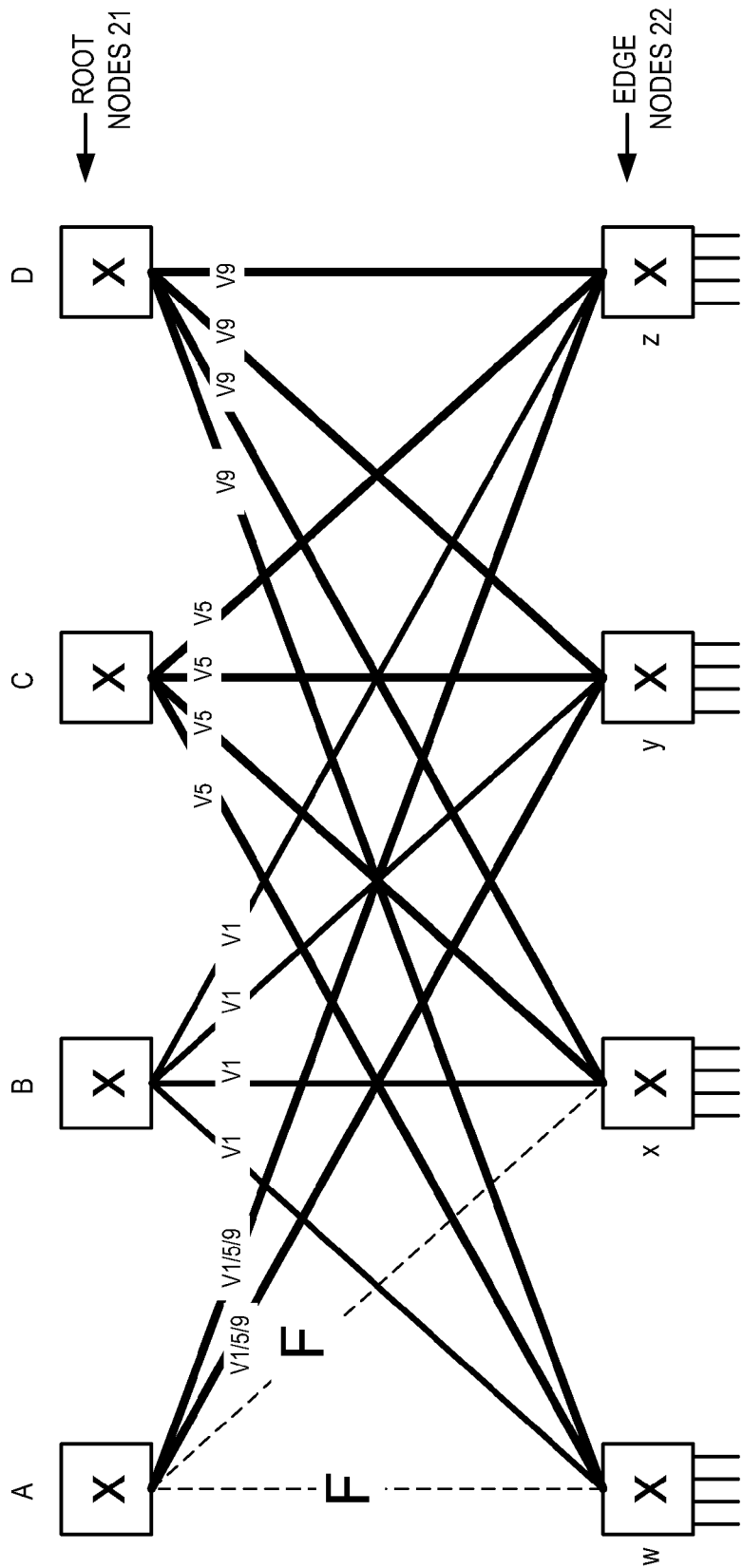
FIG. 8 illustrates a second scenario in which two links fail according to an embodiment.

FIG. 8 illustrates another scenario in which two links connecting to node A fail. In this scenario, nodes y and z can still communicate between themselves via the v1/5/9 links using the 802.1ah multicast MAC (*,G) addressing. However, to communicate with nodes w and x, nodes y and z need to use the SPF tree links labeled with v1, v5 and v9. Thus, in one embodiment, nodes y and z use the (S,G) addressing to forward multicast data frames to nodes w and x as there are multiple nodes with failed adjacencies to a common root, while nodes w and x use the 802.1ah multicast MAC (*,G) addressing to multicast to each other as well as nodes y and z.

Figure 9:
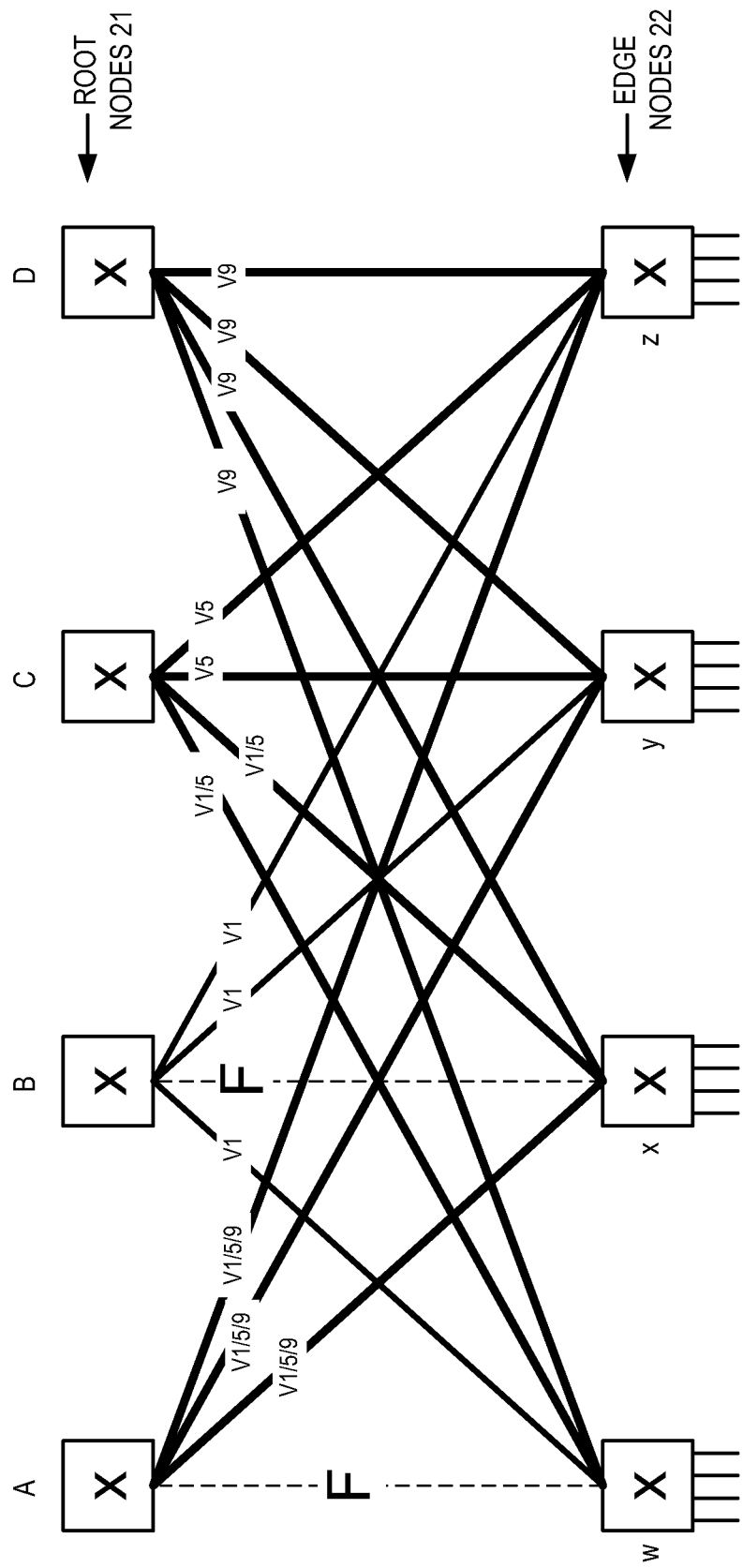
FIG. 9 illustrates a third scenario in which two links fail according to an embodiment.

FIG. 9 illustrates another scenario in which a first link between nodes A and w fails and a second link between nodes B and x also fails. When the spanning tree for A is computed, node w emerges as being served by a three hop path. As the SPF tree for B-VID 1 no longer has a working path (between nodes B and x) for node w to communicate with node x, this failed path can be replaced by the path w-C-x, and this is determined as a result of computing the SPF tree from nodes w which transits more than one root. The links to nodes x, y and z with the label v1/5/9 are failure-free, and therefore can continue to be used by nodes x, y and z to forward data amongst themselves using the (*,G) addressing. However, to communicate with node w, nodes x, y and z need to use the SPF tree links labeled with v1, v5 and v9. Thus, in one embodiment, nodes x, y and z use unicast or (S,G) addressing to forward multicast data to node w, while node w uses (*,G) addressing to forward multicast data to nodes x, y and z.

Figure 10:
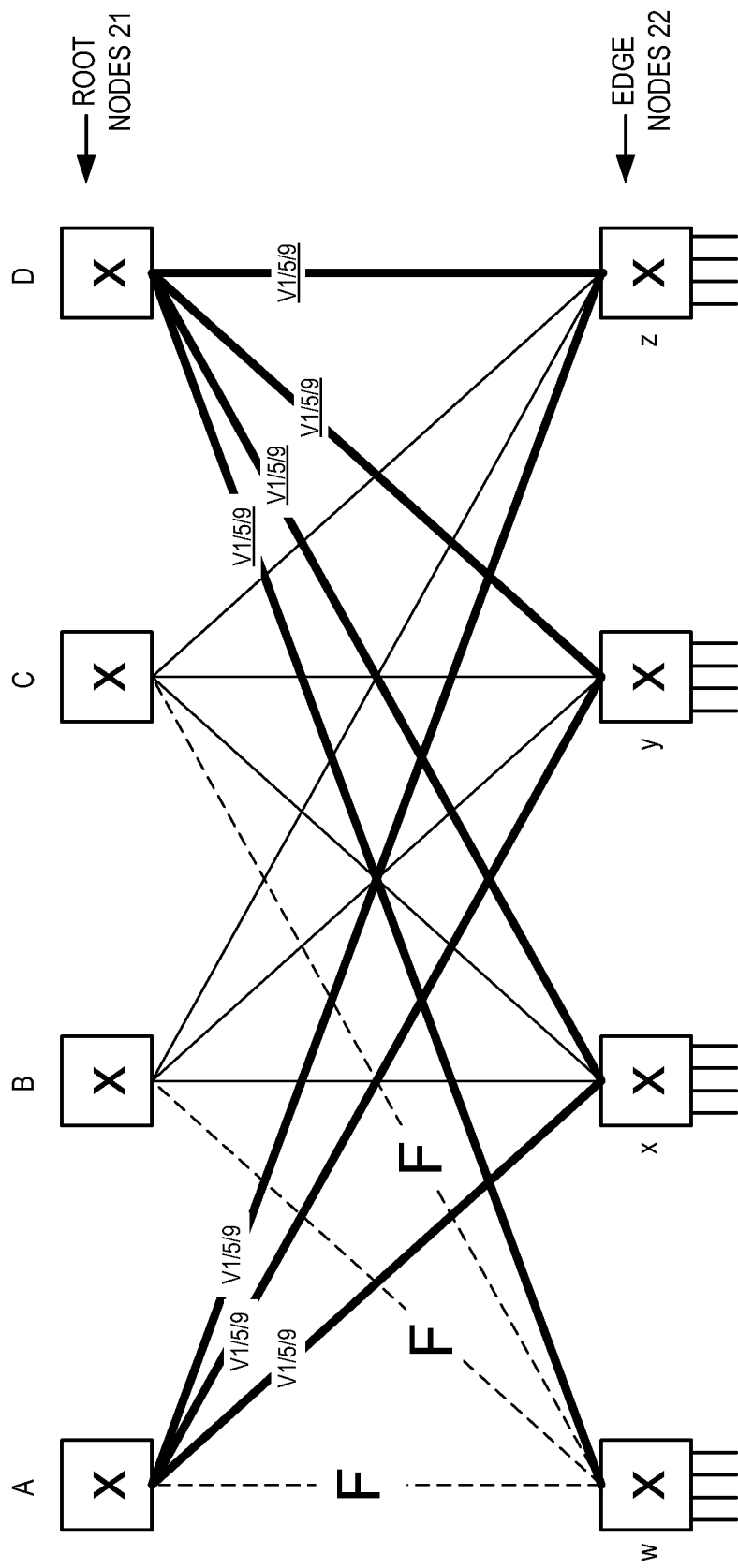
FIG. 10 illustrates a first scenario in which three links fail according to an embodiment.

FIG. 10 illustrates another scenario in which three out of the four links connecting to node w fails. In this scenario, the links to nodes x, y and z with the label v1/5/9 are failure-free, and therefore can continue to be used by nodes x, y and z to forward data amongst themselves using the 802.1ah multicast MAC (*,G) addressing. However, communication with node w is via the only working link connecting between node w and node D. Thus, the three SPF trees rooted on node w for B-VIDs 1, 5 and 9 (labeled with v1/5/9) all transit node D. To communicate with node w, nodes x, y and z need to use the SPF tree links labeled with v1/5/9. Thus, in one embodiment, nodes x, y and z use unicast or the (S,G) addressing to forward multicast data to node w, while node w uses the (*,G) addressing to forward multicast data to nodes x, y and z.

Figure 11:
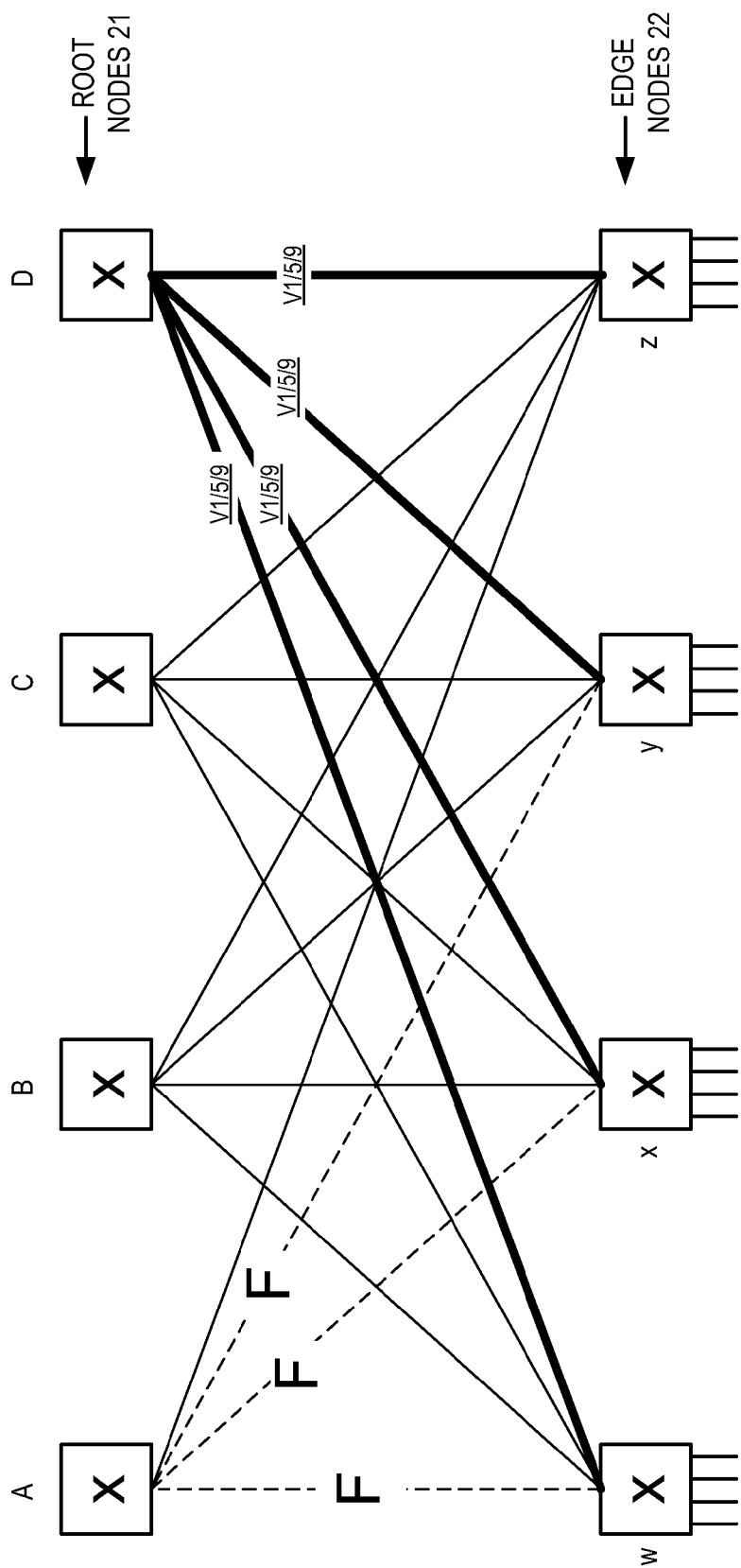
FIG. 11 illustrates a second scenario in which three links fail according to an embodiment.

FIG. 11 illustrates another scenario in which three out of the four links connecting to node A fails. In this scenario, communication with node w is via the only working link connecting to node w (leftmost link labeled with v1/5/9 as shown). The link between A-z is not used as node z cannot use this link to reach any other edge nodes. Thus, the root node A is "practically" severed from the network because it cannot service any of the edge nodes for useful data forwarding. This scenario uses four multicast addresses: nodes w, x and y uses the 802.1aq multicast MAC (S,G) addressing, and node z uses the 802.1ah multicast MAC (*,G) addressing. In addition, there are also one spanning tree rooted on node A and three split horizon computations rooted on nodes w, x and y respectively.

Figure 12:
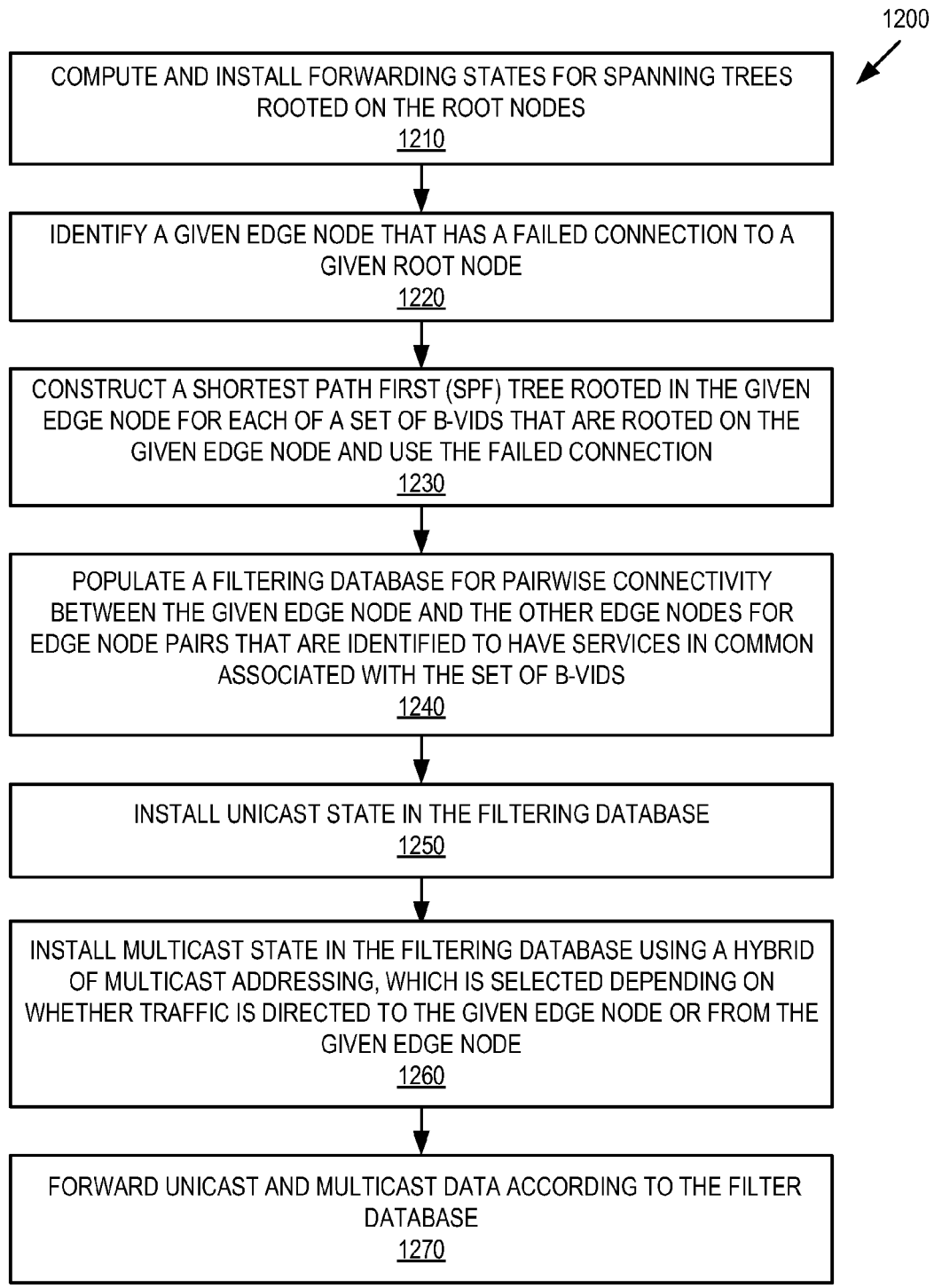
FIG. 12 illustrates an embodiment of a method for data frame forwarding when a failure occurs in a three stage folded Clos network.

FIG. 12 is a flow diagram illustrating a method 1200 for data frame forwarding when a failure occurs in a three stage folded Clos network. In one embodiment, the method 1200 begins with each node computing and installing forwarding states for spanning trees rooted on the root nodes (block 1210), wherein data forwarding in the spanning trees utilizes 802.1ah multicast addresses for multicast paths when there is no failure in the network. When it is detected (e.g., by the Dijkstra algorithm described above in FIG. 4) that a given edge node has a failed connection to a given root node (block 1220), an SPF tree rooted on the given edge node is constructed for each of a set of B-VIDs that are rooted on the given edge node and use the failed connection (block 1230). The common I-SIDs shared by the given edge node and the other edge nodes are identified, and this information is used to populate the FDB in each node for pairwise connectivity between the given edge node and the other edge nodes for edge node pairs that are identified to have services in common associated with the set of B-VIDs (block 1240). The unicast state is installed in the FDB (block 1250). The multicast state is also installed in the FDB using a hybrid of multicast addressing, which is selected depending on whether traffic is directed to the given edge node or from the given edge node (block 1260). The nodes then forward unicast and multicast data according to the FDB (block 1270). The data is forwarded according to the hybrid multicast addressing, with which the given edge node forwards data frames to the other edge nodes via the SPF trees using the 802.1ah multicast MAC addressing, and the other edge nodes forwards data frames to the given edge node via the SPF trees using unicast or the 802.1aQ multicast MAC addressing.

The methods 400 and 1200 described above with reference to FIGS. 2-12 can be further optimized. In the examples of FIG. 2, twelve spanning trees are generated for B-VIDs 1-12 (only three spanning trees are shown). As there are actually only four roots, the result of the four spanning tree computations can be reused. Similarly, in the first fail two links scenario (FIG. 7) and the first fail three links scenario (FIG. 10), the computation from node w can be reused.

For smaller networks it is also possible to envision some degree of pre-computation and replacement of the routing system with a simpler internal system management function either as a separate system or integrated into the nodes; e.g., a Clos network built of 8 port switches has 32 links. A sparse table can be constructed in advance of all single link and node failure scenarios that map the B-VIDs to which root and what addressing to use; e.g., about 40 entries (vs. 232 possible network states) in the table. For an edge node, the FDB entries can be generated by pointing the forwarding entries at the correct root node. For a root node, the FDB entries can be generated by determining the intersection of I-SID interest for each edge pair, and populating the root FDB accordingly.

The description above deals with spreading the load on failure such that the displaced load is shared as equally as possible across the surviving nodes. However, evenly distributing the load may not always be desirable as all customers would transition from having a non-blocking service to having a blocking service. In one embodiments, priority can be given to a subset of VLANs (identified by respective B-VIDs for the spanning trees) to preserve non-blocking under failure scenarios. Failures outside the prioritized set of spanning trees are not spread within their set. Failures within their set are spread to outside their set. In this way a subset of customers can be guaranteed non-blocking behavior whenever not directly affected by a failure.

Further, knowledge of current traffic patterns can also be exploited. It is assumed that traffic is evenly distributed in a data center, e.g., a fully utilized network. Algorithms can be developed to exploit an underutilized network. For example, under-utilized trees can get a larger share of traffic shifted to them on failure. Therefore, the network is not truly non-blocking, only non-blocking based on current offered load.

Further, changing the arrangement of backup nodes/paths can be hitlessly (i.e., without loss of data) provisioned. A node's position as the second or third candidate on failure in a given system ID set can be modified via changing its system ID in that system ID set. A management system can configure and adjust these systems IDs to modify how traffic is shifted. Given that the current forwarding pattern is based on the lowest XOR tiebreaker value, the hierarchy of the next best can be modified in service without affecting the forwarding patterns.

Figure 13:
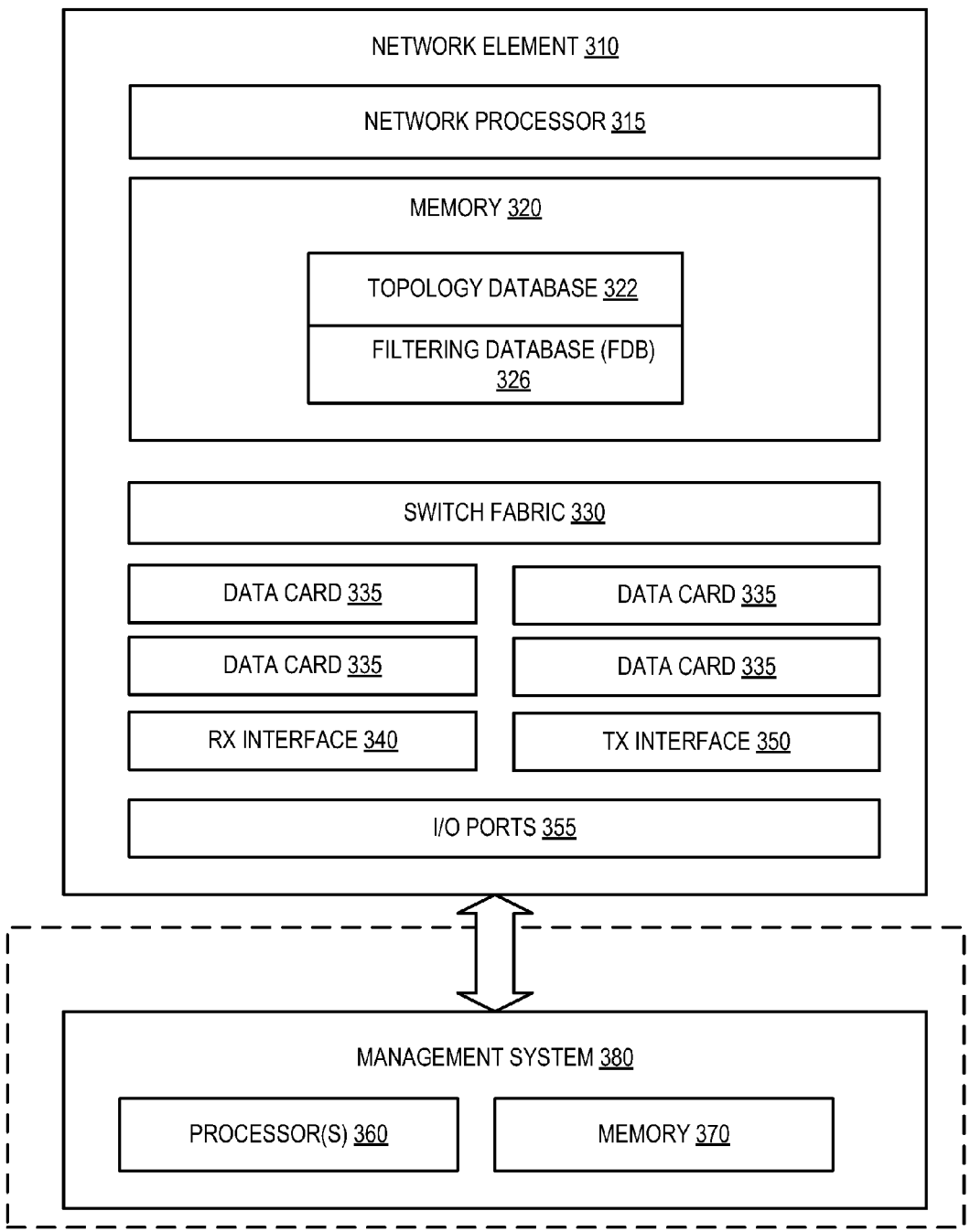
FIG. 13 is a block diagram illustrating a network element coupled to a management system according to an embodiment.

FIG. 13 illustrates an example of a three stage folded Clos network element that may be used to implement an embodiment of the invention. The network element 310 may be any node (edge node or root node) in a three stage folded Clos network described above.

As shown in FIG. 13, the network element 310 includes a data plane including a switching fabric 330, a number of data cards 335, a receiver (Rx) interface 340, a transmitter (Tx) interface 350 and I/O ports 355. The Rx and Tx interfaces 340 and 350 interface with links within the network through the I/O ports 355. If the network element is an edge node, the I/O ports 355 also include a number of user-facing ports for providing communication from/to outside the network. The data cards 335 perform functions on data received over the interfaces 340 and 350, and the switching fabric 330 switches data between the data cards/I/O cards.

The network element 310 also includes a control plane, which includes one or more network processors 315 containing control logic configured to handle the routing, forwarding, and processing of the data traffic. The network processor 315 is also configured to perform split tiebreaker for spanning tree root selection, compute and install forwarding states for spanning trees, compute SPF trees upon occurrence of a link failure, populate a FDB 326 for data forwarding. Other processes may be implemented in the control logic as well.

The network element 310 also includes a memory 320, which stores the FDB 326 and a topology database 322. The topology database 322 stores a network model or similar representation of the network topology, including the link states of the network. The FDB 326 stores forwarding states of the network element 310 in one or more forwarding tables, which indicate where to forward traffic incoming to the network element 310.

In one embodiment, the network element 310 can be coupled to a management system 380. In one embodiment, the management system 380 includes one or more processors 360 coupled to a memory 370. The processors 360 include logic to configure the system IDs and operations of the network element 310, including update the system IDs to thereby shift work distribution in the network, assign priority to a subset of spanning trees such that non-blocking properties of the network are retained for at least these spanning trees. In one embodiment, the management system 380 may perform a system management function that computes forwarding tables for each node and then downloads the forwarding tables to the nodes. The system management function is optional (as indicated by the dotted lines); as in an alternative embodiment a distributed routing system may perform the computation where each node computes its forwarding tables.

One of the advantages of embodiments described herein is that for a network of N total nodes in the network, the use of split tiebreakers adapted to spanning tree root selection means on root failure the computational load is significantly diminished, such that the complexity of the computation is: (number of surviving roots)×O(N ln N). This is a significant improvement over the 802.1aq complexity of $O(N^2 \ln N)$. For the embodiments described herein, the computational complexity is diminished in both fault free and failure scenarios.

The use of split horizon rooted trees to address link failure scenarios also reduces the computational load, such that the complexity is (number of roots)×O(N ln N)+(number of edges adjacent to failed links)×O(N ln N). In comparison, the nominal complexity for 802.1aq is $O(N^2 \ln N)$. Again for the embodiments described herein, the computational complexity is diminished in both fault free and failure scenarios.

Further, the use of split horizon rooted trees means only the edge nodes sending to another edge node (e.g., node w in the examples of FIGS. 6-11) that is adjacent to a failed link need to bi-cast to their normal spanning tree (*,G) and to a unicast path to this other edge node (e.g., node w); while this other edge node itself (e.g., node w) can continue to use (*,G) addressing.

The use of the nodal tiebreaker values for root election means that the roots do not need to be explicitly identified by other means, hence less to be mis-configured.

The functions described above may be implemented as a set of program instructions that are stored in a computer readable memory and executed on one or more processors on a computer platform associated with a network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

The operations of the flow diagrams of FIGS. 4 and 12 have been described with reference to the exemplary embodiments of FIGS. 1, 2 and 13. However, it should be understood that the operations of the diagrams of FIGS. 4 and 12 can be performed by embodiments of the invention other than those discussed with reference to FIGS. 1, 2 and 13, and the embodiments discussed with reference to FIGS. 1, 2 and 13 can perform operations different than those discussed with reference to the diagrams of FIGS. 4 and 12. While the diagrams of FIGS. 4 and 12 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge, controller) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for Ethernet routing within a three stage folded Clos network with improved efficiency for computational complexity, network administration, multicast addressing and load redistribution in case of failure in the network, wherein the network comprises a plurality of nodes each representing a network element, the nodes including root nodes and edge nodes, each edge node comprising a set of user-facing input and output ports and each root node comprising a set of ports for interconnecting the edge nodes, the method comprising the steps of:

computing and installing by each node in the network forwarding state for spanning trees rooted on the root nodes, wherein data forwarding in the spanning trees utilizes any source addresses for multicast paths when there is no failure in the network;

identifying a given one of the edge nodes as having a failed connection to a given one of the root nodes;

constructing by each node in the network or a system management function a shortest path first (SPF) tree rooted on the given edge node as a prototype for connectivity to that given edge node, the SPF tree being constructed for each of a set of Backbone Virtual Local Area Network identifiers (B-VIDs) for the spanning trees rooted on the given root node and use the failed connection, wherein the SPF tree serves as a prototype for unicast and multicast connectivity to that given edge node for that B-VID;

populating a filtering database for pairwise connectivity between the given edge node and the other edge nodes for edge node pairs that are identified to have services in common associated with the set of B-VIDs;

installing unicast state in the filtering database;

installing multicast state in the filtering database using a hybrid of multicast addressing, which is selected depending on whether traffic is directed to the given edge node or from the given edge node; and forwarding unicast and multicast data in the network according to the filtering database.

2. The method of claim 1, wherein the step of forwarding data frames further comprises the steps of:

forwarding a first set of data frames from the given edge node to the other edge nodes using 802.1ah multicast Medium Access Control (MAC) addressing to reach all of the edge nodes in a group having a same service identifier; and forwarding a second set of data frames from each of the other edge nodes to the given edge node using unicast or 802.1aq multicast MAC addressing, wherein the unicast and the 802.1aq multicast MAC addressing allows communication to a subset but not all of the edge nodes in the group.

3. The method of claim 1, further comprising the step of:

selecting for each of the spanning trees a root node that has a lowest system ID among the nodes in the network when a system ID of the node is transformed by a mask value associated with the spanning tree.

4. The method of claim 3, further comprising:

receiving multiple system IDs by each node for tiebreaking during spanning tree root selection such that workload of a failed root node is distributed across multiple other root nodes.

5. The method of claim 1, wherein the step of computing and installing further comprising the step of:

computing for each root node its paths to the edge nodes using a Dijkstra algorithm to form a spanning tree for a given B-VID in the network;

pruning the paths having more than one hop to the edge nodes from the spanning tree; and identifying a three hop path in the spanning tree as having a link failure between an edge node at the end of the three hop path failure and that root node.

6. The method of claim 1, further comprising the steps of:

identifying edge-edge node pairs that are associated with the same service identifiers; and constructing the filtering database for each node in the network based on the identified edge-edge node pairs.

7. The method of claim 6, wherein the step of constructing the filtering database further comprises the steps of:

populating the filtering database by each edge node such that I-SID multicast addresses point to the root of a spanning tree and a nodal unicast address of the edge node; and populating the filtering database by each root node to cross-connect multicast entries in the filtering database to the identified edge-edge node pairs and the nodal unicast address of the root node.

8. The method of claim 1, further comprising the steps of: identifying a subset of the spanning trees as having priority over others of the spanning trees in the network; and spreading failures within the subset to outside the subset, without spreading failures outside the subset into the subset.

9. The method of claim 1, wherein the failure in the network comprises the following: a failed root node, a partially severed root node where more than one link connecting the partially severed root node fails, a practically severed root node with a single link surviving, a partially severed edge node where more than one link connecting the partially severed edge node fails, or multiple failed links each connecting to a different root node and a different edge node.

10. The method of claim 1, wherein the three stage folded Clos network represents a network within a data center.

11. A network element functioning as an edge node of a three stage folded Clos network that uses Ethernet routing with improved efficiency for computational complexity, network administration, multicast addressing and load redistribution in case of failure in the network, the edge node comprising:
a first set of user-facing input and output ports;
a second set of input and output ports coupled to a plurality of root nodes;
memory to store a filtering database; and
a network processor coupled to the memory, the first set of user-facing input and output ports, and the second set of input and output ports, the network processor configured to:
compute and install forwarding states for spanning trees rooted on the root nodes;
construct a shortest path first (SPF) tree rooted on the given edge node as a prototype for connectivity to that given edge node, the SPF tree being constructed for each of a set of Backbone Virtual Local Area Network identifiers (B-VIDs) for the spanning trees rooted on the given root node and use the failed connection, wherein the SPF tree serves as a prototype for unicast and multicast connectivity to that given edge node for that B-VID;
populate a filtering database for pairwise connectivity between the given edge node and the other edge nodes for edge node pairs that are identified to have services in common associated with the set of B-VIDs;
install unicast state in the filtering database;
install multicast state in the filtering database using a hybrid of multicast addressing, which is selected depending on whether traffic is directed to the given edge node or from the given edge node; and
forward unicast and multicast data in the network according to the filtering database.

12. The network element of claim 11, wherein the network element is coupled to a management system, wherein the management system constructs the SPF tree for each B-VID instead of each node in the network.

13. The network element of claim 11, wherein the network processor further configured to:
forward a first set of data frames from the given edge node to the other edge nodes using 802.1ah multicast Medium Access Control (MAC) addressing to reach all of the edge nodes in a group having a same service identifier; and
forward a second set of data frames from each of the other edge nodes to the given edge node using unicast or 802.1aq multicast MAC addressing, wherein the unicast and the 802.1aq multicast MAC addressing allows communication to a subset but not all of the edge nodes in the group.

14. The network element of claim 11, wherein the network processor further configured to:
select for each of the spanning trees a root node that has a lowest system ID among the root nodes when a system ID of the root node is transformed by a mask value associated with the spanning tree.

15. The network element of claim 14, wherein each node receives multiple system IDs for tiebreaking during spanning tree root selection such that workload of a failed root node is distributed across multiple other root nodes.

16. The network element of claim 11, wherein the network processor is further configured to:
compute for each root node its paths to the edge nodes using a Dijkstra algorithm to form a spanning tree for a given B-VID in the network;
prune the paths having more than one hop to the edge nodes from the spanning tree; and
identify three hop paths in the spanning tree as reaching nodes that have a link failure on their adjacency with that root node.

17. The network element of claim 11, wherein the failure in the network comprises the following: a failed root node, a partially severed root node where more than one link connecting the partially severed root node fails, a practically severed root node with a single link surviving, a partially severed edge node where more than one link connecting the partially severed edge node fails, or multiple failed links each connecting to a different root node and a different edge node.

18. The network element of claim 11, wherein each root node is a Backbone Core Bridge (BCB) and each edge node is a Backbone Edge Bridge (BEB).

19. The network element of claim 11, wherein the three stage folded Clos network represents a network within a data center.

20. A system of a three stage folded Clos network that uses Ethernet routing with improved efficiency for computational complexity, network administration, multicast addressing and load redistribution in case of failure in the network, the system comprising:
a plurality of edge nodes, each of the edge nodes comprising a set of user-facing input and output ports; and
a plurality of root nodes, each of the root nodes comprising a set of ports for interconnecting the plurality of edge nodes,
wherein each of the root nodes and edge node comprises:
memory to store a filtering database; and
a network processor coupled to the memory, the network processor configured to:
compute and install forwarding states for spanning trees rooted on the root nodes;
construct a shortest path first (SPF) tree rooted on the given edge node as a prototype for connectivity to that given edge node, the SPF tree being constructed for each of a set of Backbone Virtual Local Area Network identifiers (B-VIDs) for the spanning trees rooted on the given root node and use the failed connection, wherein the SPF tree serves as a prototype for unicast and multicast connectivity to that given edge node for that B-VID;
populate a filtering database for pairwise connectivity between the given edge node and the other edge nodes for edge node pairs that are identified to have services in common associated with the set of B-VIDs;
install unicast state in the filtering database;
install multicast state in the filtering database using a hybrid of multicast addressing, which is selected depending on whether traffic is directed to the given edge node or from the given edge node; and
forward unicast and multicast data in the network according to the filtering database.

21. The system of claim 20, further comprising:
a management system that constructs the SPF tree for each B-VID instead of each node in the network.

22. The system of claim 20, wherein the network processor further configured to:
forward a first set of data frames from the given edge node to the other edge nodes using 802.1ah multicast Medium Access Control (MAC) addressing to reach all of the edge nodes in a group having a same service identifier; and
forward a second set of data frames from each of the other edge nodes to the given edge node using unicast or 802.1aq multicast MAC addressing, wherein the unicast and the 802.1aq multicast MAC addressing allows communication to a subset but not all of the edge nodes in the group.

23. The system of claim 20, wherein the network processor further configured to:
select for each of the spanning trees a root node that has a lowest system ID among the root nodes when a system ID of the root node is transformed by a mask value associated with the spanning tree.

24. The system of claim 23, further comprising:
a management system that configures each node with multiple system IDs used for tiebreaking during spanning tree root selection such that workload of a failed root node is distributed across multiple other root nodes.

25. The system of claim 20, wherein the failure in the network comprises the following: a failed root node, a partially severed root node where more than one link connecting the partially severed root node fails, a practically severed root node with a single link surviving, a partially severed edge node where more than one link connecting the partially severed edge node fails, or multiple failed links each connecting to a different root node and a different edge node.

26. The system of claim 20, wherein each root node is a Backbone Core Bridge (BCB) and each edge node is a Backbone Edge Bridge (BEB).

27. The system of claim 20, wherein the three stage folded Clos network represents a network within a data center.

* * * * *